INVENTOR.
DONALD E. GREMPLER
BY Shanley & O'Neil
ATTORNEY

INVENTOR.
DONALD E. GREMPLER
BY Shanley & O'Neil
ATTORNEY

INVENTOR.
DONALD E. GREMPLER
BY Shanley & O'Neil
ATTORNEY

United States Patent Office 3,427,439

Patented Feb. 11, 1969

3,427,439

DATA RETRIEVAL CONTROL FOR CARD CONTROLLED MACHINES

Donald E. Grempler, Timonium, Md.
(305 E. Joppa Road, Towson, Md. 21204)

Filed Sept. 15, 1964, Ser. No. 396,521
U.S. Cl. 235—61.7 2 Claims
Int. Cl. G06k *1/00, 1/12*

ABSTRACT OF THE DISCLOSURE

Improvement to record card controlled machines providing multiple digit selection of a single column encoded information. Automatic encoding is provided by a control panel with selectors identified with the terms of the trade where used. Control panel selection coupled with unidirectional current conducting means and switch means automatically control delivery of either sigle digit or multiple digit selection for proper comparison of encoded and scored information and selection of cards. Multiple digit selection provided by the invention adds an "and/or" function to multiple column card selection expanding the amount of information that can be stored and the selection provided by such card controlled machine.

The present invention is concerned with an improvement to the invention set forth in copending patent application of Donald E. Grempler, entitled, "Data Retrieval Control," filed on Nov. 19, 1963, Ser. No. 324,717. Specifically, the present invention deals with method and apparatus for increasing the capacity of card controlled machines of the type described in IBM® Customer Engineering Manual of Instructions 83 Sorter, Copyright 1956, 1962, by International Business Machines Corporation, by permitting a more comprehensive basis for selection of card encoded information.

Prior to the invention described in copending application Ser. No. 324,717, use of record card controlled machines had been severely limited by complex machine entry problems. The present applicant developed methods and apparatus which permitted entry into card controlled machines by anyone familiar with the terminology of the industry where applied. These developments provide background for the present invention and are set forth in applicant's copending application Ser. No. 324,717 which is incorporated herein by reference.

Record card controlled machines described in the afoementioned IBM® Customer Engineering Manual and improved with applicant's above-mentioned development remain limited in a number of ways. An inherent limitation is the ten column brush assembly which had limited the number of questions which could be asked of the machine to no more than ten per card pass. Another inherent limitation was the lack of an alternative to the "yes" or "no" answers to each individual question presented to a machine.

One object of the present invention is expansion of the capacity of such record card controlled machines permitting the number of questions which may be presented to a machine per card pass to exceed ten.

Another object of the present invention is to permit card selection based on alternate answers in addition to the "yes" or "no" as previously limited, for example, card selections based on "and/or" functions.

The need for record card controlled machines with these capabilities is obvious in the real estate business. For example it is often necessary to select cards identifying houses based on alternate area locations, several types of design and several types of construction, three or four bedrooms, powder room, family room, garage, size of lot, waterfront, trees, fireplace, several prices, etc. Questions such as fireplace with or without trees, garage with or without family room, and three or four bedrooms were previously impossible with the record controlled machine of interest. The present invention permits easy handling of such questions on these machines by any person able to read.

Figure 1:
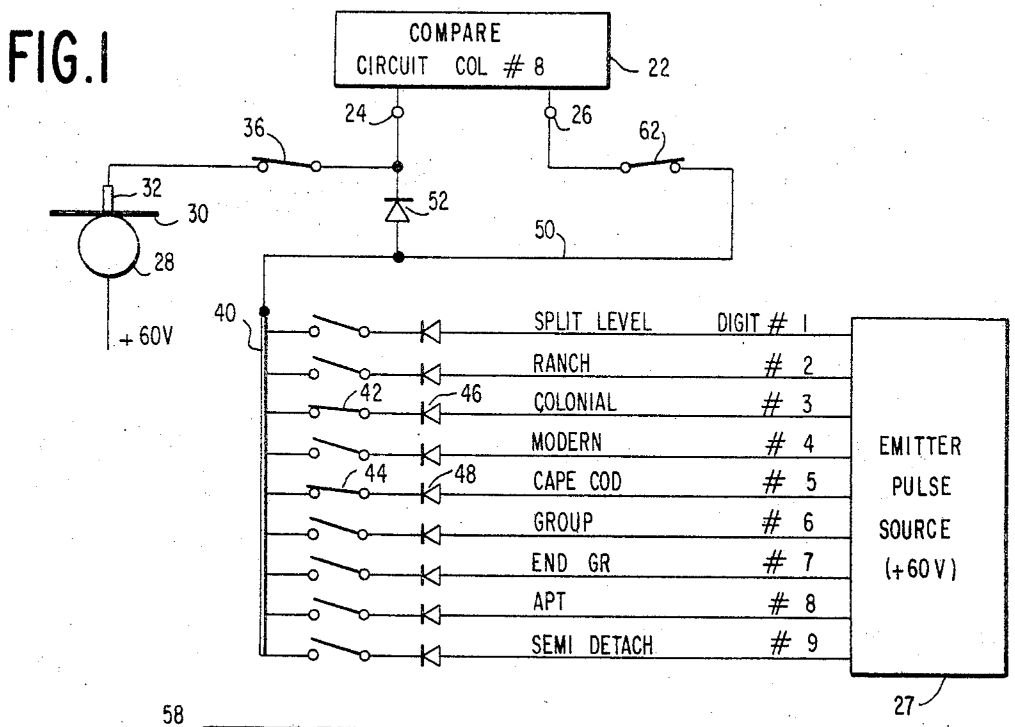
Figure 2:
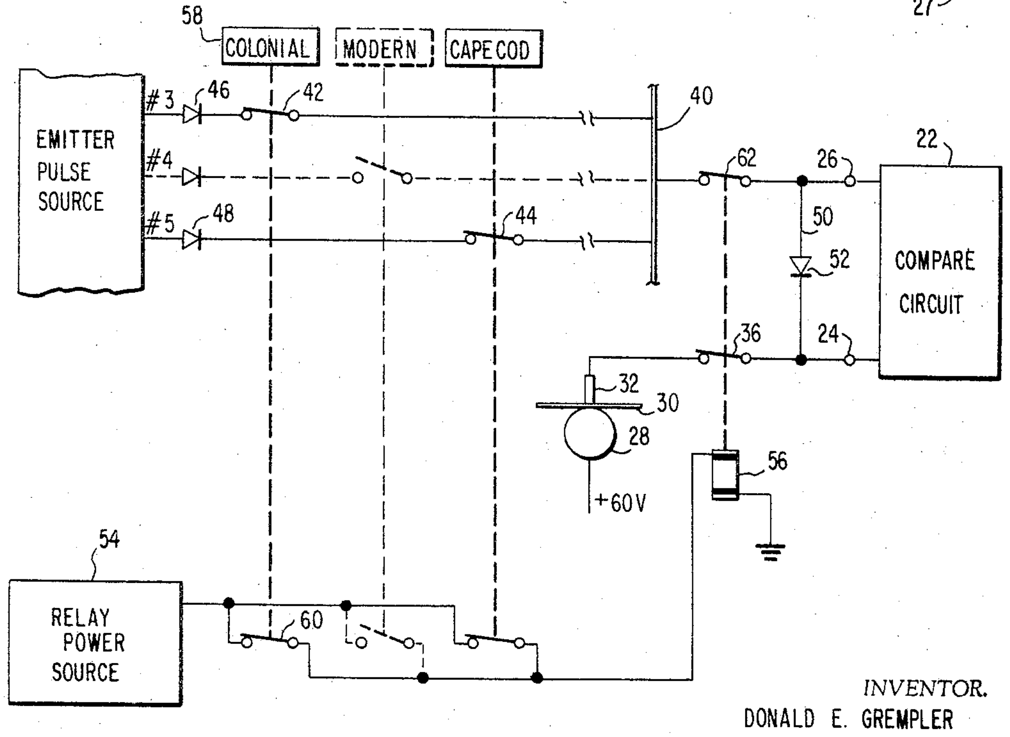
Figure 3:
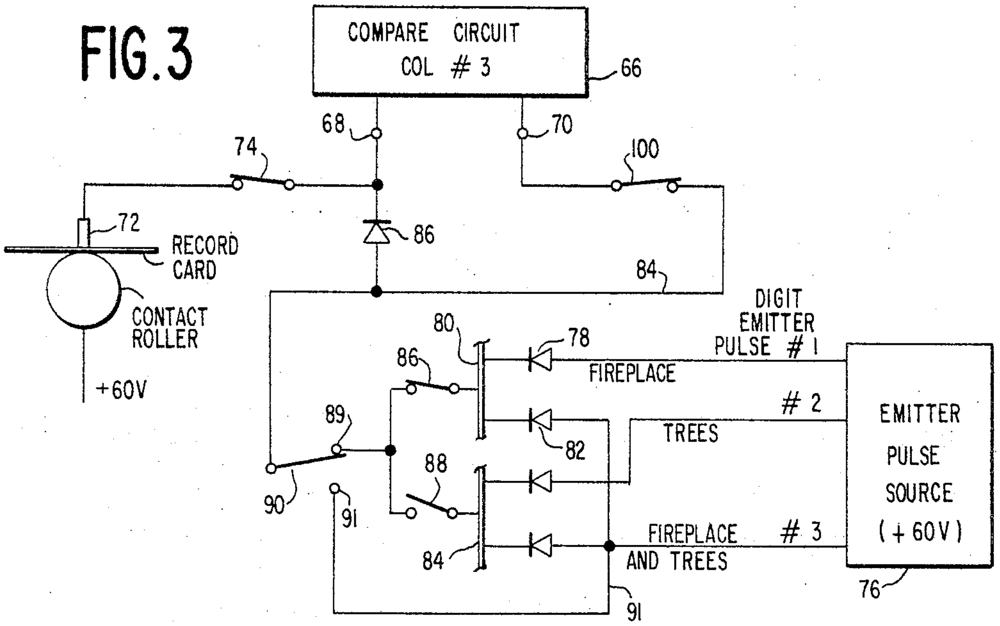
Figure 5:
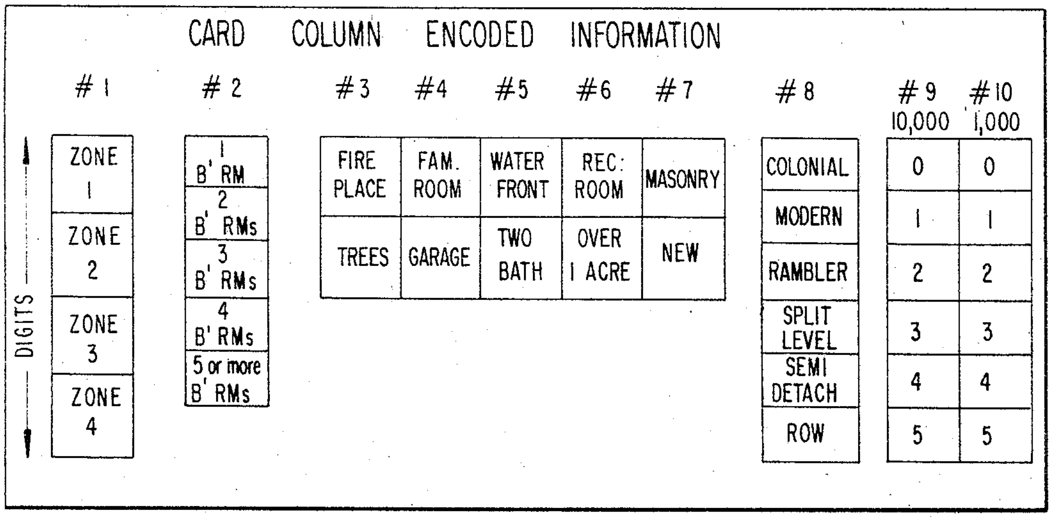
Figure 4:
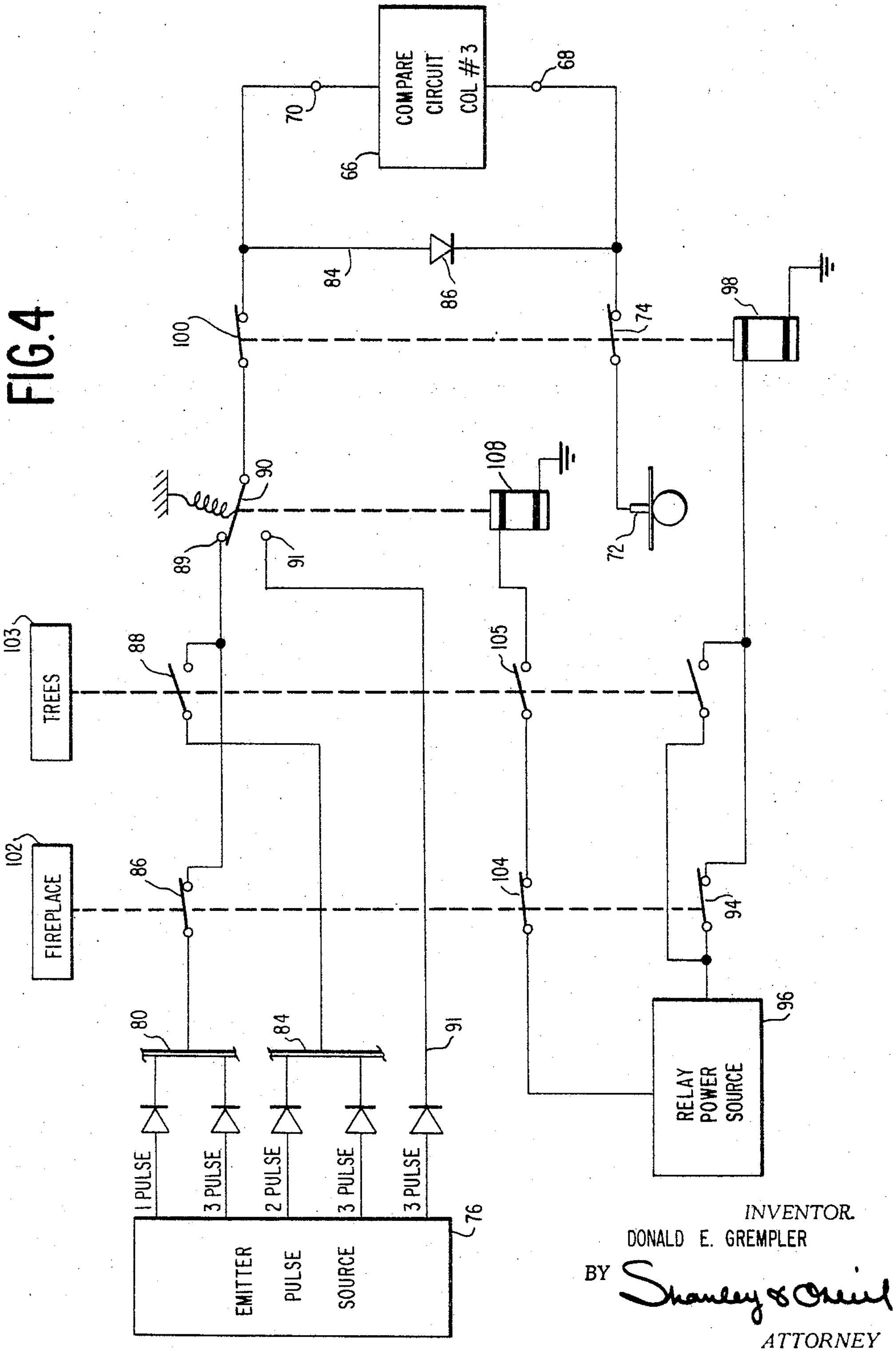

In describing the invention, reference will be had to the accompanying drawings, wherein:

FIGURE 1 is a schematic diagram of a circuit embodying the invention by permitting "yes", "no", and "and/or" functions to be performed in selecting cards, FIGURE 2 illustrates connection of the circuit of FIGURE 1 to a control panel, FIGURE 3 is a schematic diagram of an electrical circuit embodying the invention by permitting "yes", "no", and "and" functions to be performed in selecting cards, FIGURE 4 illustrates connection of the circuit of FIGURE 3 to a control panel, and FIGURE 5 shows an arrangement of card encoded information according to column and digit number placement.

In a record card controlled machine of the type described in the above IBM® manual, a compare circuit is provided for each individual column to be interrogated by an individual brush of the ten brush assembly. Referring to FIGURE 1, compare circuit 22 covers Column #8, as designated in FIGURE 5, concerned with design of house data. Compare circuit 22 has two signal entry points, 24 and 26. The source of electrical signals is emitter pulse source 27. One path for an electrical signal is through contact roller 28, and a record card 30 to sensing brush 32. Switch 36 controls delivery of an electrical signal from sensing brush 32 to entry point 24.

As is known, a coincidence of signals arriving at points 24 and 26 in the circuit of FIGURE 1 is required in order for a card to be accepted. A signal arriving at one of these terminals without a coincident signal at the other terminal causes rejection of the card being scanned. However, to carry out the objects of the present invention it is necessary to be able to make a plurality of selections which would ordinarily cause rejection of a card.

To carry out objects of the invention, and avoid undesirable rejection of cards, a common terminal means 40 is connected in the path between emitter pulse source 27 and entry point 26. Each selection of a style of house controls delivery of a separate digit emitter pulse from source 27 to a common terminal means 40. A plurality of switches is provided for this purpose, for example, switch 42 controls the COLONIAL selection (digit #3) and switch 44 controls the CAPE COD selection (digit #5). In order to avoid faulty back circuits a diode is connected in each digit emitter pulse circuit, for example diode 46 in digit pulse #3 circuit and diode 48 in digit pulse #5 circuit.

With the above circuit a pulse will be delivered to entry point 26 at both digit #3 and digit #5 pulse times. However since a record card can have only a single datum encoded, such as Colonial or Cape Cod, etc., a desired record card would be rejected. To avoid such rejection, the invention teaches voltage biasing of entry point 24 for both selections. Voltage biasing means include connector 50 and diode 52. Biasing connector 50 is connected between common terminal means 40 and entry point 24 through diode 52. In order to avoid faulty back circuits when record card 30 includes encoded information at other than selected digit numbers, diode 52 is connected as shown in FIGURE 1.

FIGURE 2 shows a simplified means for carrying out selections from a control panel and for proper delivery of electrical signals to entry points 24 and 26 within a card controlled machine. Where possible like numbers have been used to designate elements shown in the schematic circuit of FIGURE 1. The circuit of FIGURE 2 shows control switches in the electrical lines to entry points 24 and 26 ganged to a single selection button. It is understood that other switches and power sources, such as an indicating light circuit for selected buttons may be similarly joined without departing from the invention.

In FIGURE 2 an isolation relay power source 54 provides electrical power for relay 56. Selection of the COLONIAL button 58 closes switch 42 and switch 60. Switch 42 closes the circuit from digit emitter #3 to common terminal 40. Switch 62 is provided between common terminal 40 and entry point 26. Switch 60 controls delivery of power to relay 56 which closes switches 62 and 36 completing the circuits to entry points 26 and 24, respectively.

The circuits described in relation to FIGURES 1 and 2 permit "and/or" functions to be performed in selecting cards. That is, COLONIAL and/or CAPE COD houses can be selected. The same arrangement permits plural selection of other related items such as three and/or four bedroom houses (Column #2 of FIGURE 5), etc.

In order to premit maximum selectivity, the invention interrelates a series of ordinarily unrelated items. These are grouped in columns permitting selection of one item, both items, or one item with or without the other. For example, the circuit shown schematically in FIGURE 3 permits selection based on any combination of trees and/or fireplace data recorded in the column being interrogated.

In the circuit of FIGURE 3, compare circuit 66 has entry points 68 and 70. The electrical path for a signal from sensing brush 72 to entry point 68 is through switch 74. To analyze the paths from emitter pulse source 76 to entry point 70, consideration should be given to possible selections. A person desiring a house with a fireplace would be interested in a house with a fireplace with or without trees. A person interested in a house with trees would be interested in a house with trees with or without a fireplace. A requirement for fireplace and trees would eliminate houses with only one of these items. Therefore, in accordance with the invention, digit emitter pulse #1 relating to houses with a fireplace only is joined through diode 78 to terminal board 80. Digit emitter pulse #3 relating to houses with both fireplace and trees is joined to the same terminal board 80 through diode 82. In like manner, terminal board 84 joins digit emitter pulses #2 and #3. Switches 86 and 88 connect terminal board 80 and terminal board 84, respectively, to common terminal 89. Emitter pulse #3, for fireplace and trees, is connected, as shown, to terminal 91. Switch 90 connects either terminal 89 or 91 to switch 100.

FIGURE 4 shows simplified means for connecting the schematic circuit of FIGURE 3 to a control panel. Like numbers are used where appropriate in FIGURES 3 and 4. The operation of this circuit to accomplish the objects of the invention is deemed to be readily understandable from the earlier description. Briefly, however, selection of the FIREPLACE button closes switches 86, 104 and 94. The closing of switch 94 delivers power from relay power source 96 to relay 98. Switches 74 and 100 are closed by relay 98 completing a circuit to entry points 68 and 70, respectively.

The invention provides a unique circuit for accurately selecting cards when both items, fireplace and trees, are desired. Referring to FIGURE 4, selection of both FIREPLACE button 102 and TREES button 103 closes switches 104 and 105 connecting relay power source 96 to relay 108. Energization of relay 108 removes spring loaded switch 90 from common terminal 89, thereby disconnecting emitter pulse signals #1–3 and #2–3, and connects switch 90 to terminal 91, thereby delivering only emitter pulses #3 to switch 100.

FIGURE 5 shows how the information to be used in selecting cards can be arranged according to card columns when using the present invention in the real estate business. The ten brush assembly permits interrogation of ten columns. The columns can have information encoded in any one of the vertically disposed digit number positions in each column. In the embodiment as described, either or both buttons can be selected in any of the columns numbered three through seven for operation as described in relation to FIGURES 3 and 4. One or more buttons can be selected in columns numbered one, two and eight through ten for operation as described in relation to FIGURES 1 and 2.

In accrdance with the teachings of the present invention, selection of desired information on a panel as described above automatically encodes such desired information into electrical signals usable by the card controlled machine. Further, such selection also automatically sets up circuits which control delivery of such encoded signals, along with electrical signals developed during scanning of record cards, so that the required comparison of these electrical signals can be carried out during card scanning by the machine.

While the specific embodiment of the invention described above relates to the real estate business, it is to be understood that the principles of the present invention are applicable to other enterprises such as employment agencies, police files, etc.

In order to describe novel methods and apparatus for automatic entry to and operation of somewhat complex card controlled machines, a specific embodiment using simplified electrical and electromechanical devices has been described. From this disclosure, however, electronic and solid state circuits or other means for achieving the objects of the present invention can be readily derived. Therefore, it is to be understood that the present invention is not limited to the specific embodiment described and that the scope of the present invention is to be determined by the scope of the appended claims.

What is claimed is:

1. In combination with a card controlled machine having a plurality of electrical signal compare circuits corresponding to a plurality of information encoded columns on record cards, multiple-column card selector apparatus for automatically wiring the card controlled machine to compare card encoded information signals with digit emitter pulse signals for the selection of record cards, the multiple column card selector apparatus including control panel means having a plurality of individual selector means identified with encoded information titles, and circuit means including relay means operated by individual selector means to automatically control delivery of card encoded electrical signals and digit emitter pulse signals to their respective entry points for the compare circuits of the card controlled machine, common terminal means for interconnecting at least two digit emitter pulse signals, unidirectional current conducting means for each digit emitter pulse signal circuit between its source and the common terminal means permitting current only in the direction from its signal source to the common terminal means, and biasing circuit means including additional unidirectional current conducting means connecting the common terminal means to the compare circuit entry point for card encoded electrical signals, the additional unidirectional current conducting means permitting current only in the direction from the common terminal means toward the compare circuit entry point for card encoded signals.

2. In combination with a card controlled machine having an emitter pulse source, a compare circuit, and means for scanning encoded cards, the compare circuit including an entry point connected by selection of card encoded information to the emitter pulse source and an entry point connected by the means for scanning encoded cards, apparatus for controlling delivery of electrical signals and to the compare circuit automatically upon selection of desired information comprising control panel means with individual selector means identified with stored information titles, circuit means connecting the emitter pulse source and the card scanning means to the compare circuit with each digit emitter pulse signal from the emitter pulse source being timed to arrive at the compare circuit means simultaneously with scanning of a corresponding digit position on an encoded card, common terminal means for interconnecting at least two emitter pulse signals, unidirectional current conducting means for each digit emitter pulse signal circuit between the emitter pulse source and the common terminal means permitting current only in the direction from the emitter pulse source toward the common terminal means, voltage biasing circuit means interconnecting the signal entry points of the compare circuit including additional unidirectional current conducting means connecting the common terminal means to the compare circuit entry point for card encoded electrical signals permitting current only in a direction from the emitter pulse source toward the card scanning means, and switch means responsive to individual selector means of the control panel means, the switch means being located in each electrical path connecting the emitter pulse source to the compare circuit, so that multiple digit emitter pulse signals can be applied to signal entry points of the compare circuit providing an "and/or" card selectivity based on card encoded information.

References Cited

UNITED STATES PATENTS

| | | | |
|---|---|---|---|
| 3,023,399 | 2/1962 | Dickinson | 340—149 |
| 3,148,460 | 9/1964 | Haritonoff | 35—48 |

MAYNARD R. WILBUR, *Primary Examiner.*

T. J. SLOYAN, *Assistant Examiner.*

U.S. Cl. X.R.

235—61.11